United States Patent Office 3,745,129
Patented July 10, 1973

3,745,129
SILYL ORGANOMETALLOCENES USEFUL
AS ANTIOXIDANTS
Edgar D. Brown, Jr., 1130 N. Country Club Drive, and
Abe Berger, 1504 Barclay Drive, both of Schenectady,
N.Y. 12309
No Drawing. Original application July 20, 1970, Ser. No.
56,681. Divided and this application Aug. 27, 1971,
Ser. No. 175,757
Int. Cl. C10m 1/50
U.S. Cl. 252—49.7    3 Claims

ABSTRACT OF THE DISCLOSURE

Silylorganometallocenes selected from the class of:
(a) Polymers of the formula,

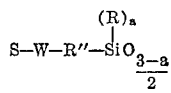

(b) Copolymers having units of the formula,

and at least one unit of (a), and
(c) Disiloxanes of the formula,

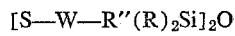

where R is a monovalent hydrocarbon radical, W is a carbamyl radical, R'' is a divalent hydrocarbon radical, and S is an organometallocene of the formula,

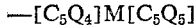

where Q is selected from hydrogen, an electron donating organic radical, and an electron withdrawing organic radical and M is a transition metal, $a$ is a whole number equal from 0 to 2 and $b$ is a whole number equal from 0 to 3. These silylorganometallocenes are useful as antioxidants for organopolysiloxane fluids under extreme oxidation conditions.

---

This application is a division of copending application Ser. No. 56,681, filed July 20, 1970, U.S. Pat. 3,649,660.

BACKGROUND OF THE INVENTION

The present invention relates to organopolysiloxanes and particularly to organopolysiloxanes having an organometallocene radical attached to the silicon by a carbon-silicon linkage.

Silylorganometallocenes can be made into room temperature vulcanizable rubbers having superior oil reversion resistance. Further, silylorganometallocenes can be utilized in smoke eliminators, dyestuffs, photographic developers, rubber vulcanization accelerators, diesel fuel additive, metal-plating reagents, polymerization catalysts, medicines, fungicides, pesticides, argicultural chemicals, damping fluids and metallocene-containing vinyl monomers for polymerization as such, or with other monomers such as chloroprene and styrene.

Recently, automobiles have been manufactured with a variable speed fan. The fan is connected to the crankshaft of the motor by means of a fluid clutch. During low operating temperatures, as when the auto is idling, little fluid is passed to the fluid clutch so that there is slipping in the clutch so that the drive shaft of the fan is not driven at the true speed of the crankshaft. When the temperature of the motor rises, a thermostat opens up to allow fluid into the fluid clutch so that the shaft of the fan is rotated at the speed of the craskshaft. In order to operate such a fluid clutch, it is necessary to utilize in it a fluid that is capable of withstanding high torsional forces at high temperatures without breaking down by oxidizing and gelling. For such an application dimethylpolysiloxane fluid has been found especially suitable. However, this ffuid oxidizes at high temperatures above 200° C. after continued use in such fluid clutch for 50 hours or more. Various antioxidants were added to the polysiloxane fluid to prevent its oxidation and gelling. Examples of such antioxidants are iron oxide, iron octoate, and manganese oxide. However, with all such antioxidants the compound either precipitated out of the fan clutch fluid or did not sufficiently protect the polysiloxane fluid and, in particular, dimethylpolysiloxane, from oxidizing and gelling. None of these antioxidants were able to prevent polysiloxane fluids from oxidizing after operating in the clutch continuously for 200 hours.

It is one object of this invention to provide a novel class of silylorganometallocenes having unique properties.

It is another object to provide a class of silylorganometallocenes which can stabilize and prevent polysiloxane fluids from oxidation.

It is yet another aim to provide a method for producing a novel class of silylorganometallocenes.

These and other objects are accomplished by the present invention set forth below.

SUMMARY OF THE INVENTION

In accordance with the present invention, there are provided silylorganometallocenes selected from the class consisting of:
(a) Polymers having structural units of the formula, (1) 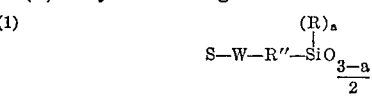

(b) Copolymers composed of structural units of the formula, (2) 

and at least one unit of (a),
(c) Disiloxanes of the formula, (3) 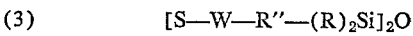

where R is a member selected from the class consisting of monovalent hydrocarbon radicals, halogenated monovalent hydrocarbon radicals, cyano radicals and fluoroalkyl radicals, S is an organometallocene radical having the formla, (4) 

where W is a carbamyl radical, R'' is selected from the class consisting of an arylene radical and an alkylene radical, Q is chemically bonded to a cyclopentadienyl radical and is a member selected from the class consisting of hydrogen, a monovalent electron donating organic radical and a monovalent electron withdrawing organic radical and M is a transition metal bonded to cyclopentadienyl radicals. In the above formula, $a$ is a whole number equal from 0 to 2, and $b$ is a whole number equal from 0 to 3.

There is further provided by the present invention a process for preventing the decomposition of polysiloxane fluids by mixing into the fluids an effective amount of the above silylorganometallocenes.

BRIEF DESCRIPTION OF THE PREFERRED EMBODIMENT

Radicals included by R are, for example, mononuclear and binuclear aryl and aralkyl, such as phenyl, naphthyl, benzyl, tolyl, xylyl, 2,6-di-t-butylphenyl, 4-butylphenyl, 2, 4,6-trimethylphenyl, biphenyl and ethylphenyl; halogen-substituted mononuclear and binuclear aryl, such as 2,6-dichlorophenyl, 4-bromophenyl, 2,5-di-fluorophenyl, 4,4'-dichlorobiphenyl, 2'-chloronaphthyl, 2,4,6-trichlorophenyl and 2,5-dibromophenyl; nitro-substituted mononuclear and binuclear aryl, such as 4-nitrophenyl and 2,6-di-nitrophenyl; alkoxy-substituted mono and binuclear aryl, such as 4-methoxyphenyl, 2,6-dimethoxyphenyl, 4-t-butoxyphenyl, 2-ethoxyphenyl, 2-ethoxynaphthyl and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl and dodecyl; alkenyl such as vinyl, allyl, n-butyl-1, n-butenyl-2, n-pentenyl-2, n-hexenyl-2, 2,3-di-methylbutenyl-2, n-heptenyl, n-decenyl and n-dodecenyl; alkynyl such as propargyl and 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3 - tribromobutyl, chloropentyl, bromopentyl, 2,3 - dichloropentyl, 3,3 - dibromopentyl, chlorohexyl, bromohexyl, 2,4-dichlorohexyl, 1,3-dibromohexyl, 1,3,4 - trichlorohexyl, chloroheptyl, bromoheptyl, fluoroheptyl, 1,3-dichloroheptyl, 1,4,4-trichloroheptyl, 2, 4 - dichloromethylheptyl, chlorooctyl, bromooctyl, iodooctyl, 2,4-dichloromethylhexyl, 2,4 - dichlorooctyl, 2,4,4-trichloromethylpentyl and 1,3,5 - tribromooctyl; haloalkenyl such as chlorovinyl, bromovinyl, chloroallyl, bromoallyl, 3-chloro-n-butenyl-1, 3 - chloro-n-pentenyl-1, 3-fluoro-n-heptenyl-1, 1,3,3-trichloro-n-heptenyl-5, 1,3,5-trichloro-n-octenyl-6, and 2,3,3-trichloromethylpentenyl-4; haloalkynyl such as chloropropargyl and bromopropargyl; nitroalkyl such as nitromethyl, nitroethyl, nitro-n-propyl, nitro-n-butyl, nitropentyl and 1,3 - dinitroheptyl; nitroalkenyl such as nitroallyl, 3 - nitro-n-butenyl-1, and 3-nitro-n-heptenyl-1; nitroalkynyl such as nitropropargyl; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl and ethoxyethoxy; alkoxyalkenyl and polyalkoxyalkenyl such as ethoxyvinyl, methoxyallyl, butoxyallyl, ethoxy-n-butenyl - 1, butoxy-n-pentenyl - 1 and methoxyethoxy-n-heptenyl-1; alkoxyalkynyl and polyalkoxyalkynyl such as methoxypropargyl; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-dimethylcycloheptyl, 4-butylcyclopentyl, 3,4-dichlorocyclohexyl, 2,6-dibromocycloheptyl, 6-methoxycyclooctyl, 2-nitrocyclopentyl 2-cyclopentenyl, 3-methyl-1-cyclopentenyl, 5-methoxy-1-cyclopentenyl, 3,4-dimethyl-1-cyclopentyl, 2,5-dimethoxy-1-cyclopentyl, 5-methyl-5-cyclopentenyl, 3,4-dichloro-5-cyclopentenyl, 5 - (tert-butyl)-1-cyclopentyl, 2-nitro-1-cyclohexenyl, 1 - cyclohexenyl, 3-methyl-1-cyclohexenyl, 3,4-dimethyl-1-cyclohexenyl and 6-methoxy-1-cyclohexenyl; cyanoalkyl such as cyanomethyl, cyanoethyl, cyanobutyl and cyanoisobutyl; cyano radicals; and fluoroalkyl.

Radicals included by R'' are arylene radicals and alkylene radicals such as phenylene, tolylene, methylene, ethylene, propylene, trimethylene, tetramethylene, pentamethylene and decamethylene.

W is a divalent carbamyl radical having the formula

Unless otherwise designated, the term "metallocene" as employed in the description of the present invention is an organometallic compound of a transition metal chemically combined with two five-membered carboxylics substituted with either hydrogen, or a mixture of hydrogen and either monovalent electron donating radicals or monovalent electron withdrawing radicals or mixtures thereof.

With reference to the monovalent electron donating organic radicals encompassed by Q, there are aryl radicals and hydroxyaryl, for example, phenyl, tolyl and hydroxyphenyl; aliphatic radicals including allyl radicals such as methyl, ethyl, propyl, butyl and octyl; alkoxy radicals such as vinyl and propargyl; cycloaliphatic such as cyclohexyl and cycloheptyl; carboxyaliphatic radicals such as carboxymethyl, and carboxyethyl; triorganosilyl radicals such as trimethylsilyl and dimethylphenylsilyl; nitro-aliphatic radicals such as nitromethyl and nitroethyl. The symbol Q also encompasses monovalent electron withdrawing organic radicals such as aliphatic aryl, formyl, acetyl, propionyl, arylaryl such as benzoyl; carboxy; aldehydric; sulfo; carboxyaryl, for example, carboxyphenyl and carboxytolyl; nitroaryl, for example, nitrophenyl; haloaryl, for example, chlorophenyl and bromotolyl; and haloaliphatic such as chloromethyl and chloroethyl. Radicals included by R of Formulas 1, 2 and 3 can be all the same radicals or any two or more of the aforementioned R radicals. Similarly, radicals included by Q can be all the same radicals or any two or more of the aforementioned Q radicals.

"Transition metal" utilized in the description of the present invention shown by M of Formula 4 includes all metals of Group III to VIII of the Periodic Table capable of forming a $\pi$ complex with a cyclopentadienyl radical to form a metallocene. The transition metals that are operative in the present invention are, for example, metals having atomic numbers 22 to 28, 40 to 46, and 71 to 78, such as titanium, vanadium, chromium, manganese, iron, cobalt, nickel, zirconium, columbium, molybdenum, technetium, ruthenium, rhodium, palladium, hafnium, tantalum, tungsten, rhenium, osmium, iridium and platinum.

The organopolysiloxanes of the present invention are produced by hydrolyzing metallocenyl halides of the formula, (5)

where S, W, R'', R and $a$ are as defined above and X is a halogen radical. The copolymeric organopolysiloxanes are produced by cohydrolyzing the metallocenyl halide of Formula 5 with halosilanes of the formula, (6)

where R and $b$ are as defined above and X is a halogen radical.

The disiloxane of Formula 3 is produced by hydrolyzing a metallocenyl halide of the formula, (7)

where S, W, R'', R and X are as defined above.

The metallocenyl halides of Formulas 5 and 7 are prepared by reacting a metallocene having the formula, (8)     $[(Q'')_e(R')_d(H)_cC_5]_2M$ with a silyl isocyanate halide of the formula, (9)

(10)

where M, R, R'', X and $a$ are as defined previously, Q' is an electron donating radical, Q'' is an electron withdrawing radical, $c$ is an integer equal from 1 to 5, $d$ is a whole number equal from 0 to 4 and $e$ is a whole number equal from 0 to 1, while the sum of $c$, $d$ and $e$ is equal to 5. The reaction is a modified Friedel Crafts reaction and is carried out in the presence of a Lewis acid such as boron trifluoride, phosphoric acid, hydrogen fluoride, zinc chloride, stannic chloride and aluminum chloride, which is preferred. Molar amounts of the reactants are used to carry out the reaction under preferred conditions. The reaction is preferably carried out in a chlorinated hydrocarbon solvent such as chloroform, dichloromethane, dichloroethane, etc. Other suitable solvents are benzene, nitrobenzene and carbon disulfide. The temperature at which the reaction can be carried out varies widely, for instance a temperature range of −25° C. to 100° C. has been found operable, while a range of 0° to 25° C. is preferred.

The addition reaction can be carried out by any of several well known Friedel-Crafts procedures. One method, for example, involves forming a complex of the halosilyl isocyanate and of the Friedel-Crafts catalyst and then reacting the complex with the metallocene in solvent. Variations of the procedures can also be carried out. For example, the halosilyl isocyanate can be added to a mixture of the aluminum halide and the metallocene in solvent.

The reaction products of metallocenyl silyl halide of Formulas 5 and 7 may be hydrolyzed by standard procedure. For the hydrolysis, an acidified mixture of water and ice can be employed. The final product can be extracted by use of a suitable organic solvent, and then removed in accordance with standard procedures, such as chromatography.

The halosilyl isocyanate of Formulas 9 and 10 are prepared by reacting a halosilane of the formula,

(11) 

with an unsaturated isocyanate of the formula,

(12) $\quad CH_2=CH(R^3)_nNCO$ where R is as previously defined, $R^3$ is a divalent hydrocarbon radical such as alkylene or arylene radical, $g$ is a whole number from 0 to 3, and $n$ is any whole number including 0. The reaction is preferably carried out without a solvent. In order for the reaction to proceed, a platinum catalyst must be used. Preferably platinum on a metal support or solubilized platinum is used. Examples of suitable platinum catalysts are disclosed in U.S. Pat. 3,220,972. Other suitable platinum catalysts are olefin platinum complexes, alcohol platinum complexes, chloroplatinic acid and platinum on solid supports as γ-alumina or charcoal. The reaction is preferably carried out at a temperature in the range of 50–100° C. The resulting halosilyl isocyanates are purified by standard procedures.

The halosilyl isocyanates of Formulas 9 and 10 may also be reacted with hydrogen chlorides to yield halosilyl carbamyl halides which can thus be used to acylate an organometallocene nucleus to yield the halosilyl metallocenes of Formulas 5 and 7. The acylating reaction is amply described in detail in U.S. Pat. 3,321,501 assigned to the same assignee as the present case.

If it is desired that W in Formulas 5 and 7 be a carbonyl group instead of a carbamyl group, then by the hydrolysis of

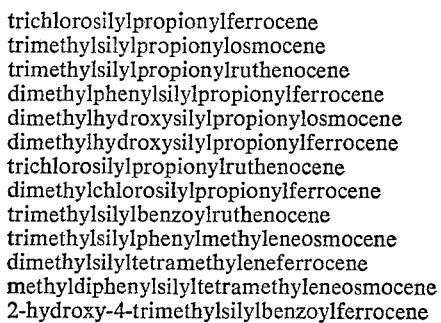

which can be prepared by Pt catalyzed hydrosilylation of olefin nitriles as allyl cyanide a compound of the formula,

(13) 

is obtained. The disiloxane of Formula 13 is then reacted with an inorganic acid halide such as $PX_3$, $PX_5$, $SOX_2$, $BX_3$, where X is a halogen radical to yield a halosilylcarbonyl halide which can then be used to acylate an organometallocene to produce a halide of Formula 7 when W is carbonyl. The carbonyl radical may further be modified or removed by a Chemmins reaction. The halosilylacylmetallocene of Formula 7 is hydrolyzed and then reaction with zinc amalgam in the presence of HCl to yield the corresponding saturated alkane.

Further, the acylated metallocene of Formulas 5 and 7 when W is a carbonyl group can be modified by converting the carbonyl group in accordance with standard chemical procedures to another carbo-functional group. Futher, modification of the metallocene nucleus can also be achieved such as by alkylation, sulfonation, and other standard reactions analogous to chemical reactions common to organic aromatic chemistry. In addition, the monovalent functional groups on the silicon atoms of the silylorgano radical can also be replaced with other monovalent radicals to provide for additional chemical reactions with the halosilylmetallocene. For example, a silicon-carbon cleavage reaction can be utilized to form silanol radicals and silicon-halogen bonds which can be alkoxylated to form alkoxy silicones.

Some of the silylorganometallocenes, of the present invention that can be made directly from ferrocene, osmocene and ruthenocene as shown in Formula 4 are, for example, trichlorosilylpropionylferrocene
trimethylsilylpropionylosmocene
trimethylsilylpropionylruthenocene
dimethylphenylsilylpropionylferrocene
dimethylhydroxysilylpropionylosmocene
dimethylhydroxysilylpropionylferrocene
trichlorosilylpropionylruthenocene
dimethylchlorosilylpropionylferrocene
trimethylsilylbenzoylruthenocene
trimethylsilylphenylmethyleneosmocene
dimethylsilyltetramethyleneferrocene
methyldiphenylsilyltetramethyleneosmocene
2-hydroxy-4-trimethylsilylbenzoylferrocene Silylorganometallocenes of the present invention within the scope of Formulas 1 and 3 are:

N-(trimethylsilylpropyl)carbamylferrocene
1,3-bis(ferrocenoylaminopropyl)tetramethyldisiloxane
tetra(ferrocenoylaminopropyl)tetramethylcyclotetrasiloxane
N-(dimethylphenylsilylbutyl)carbamylosmocene
N-(trimethylsilylphenyl)carbamylruthenocene
Ferrocenoylaminobutylpolysiloxane
α,ω-ferrocenoylaminopropyldimethylsilyl(polydimethylsiloxane)
1,3,-bis(osmocenoylaminopropyl)tetramethyldisiloxane
1,3-bis(ruthenocenoylaminopropyl)tetramethyldisiloxane Organohalosilanes shown by Formulas 6 and 11 are well known and are shown in Rochow, Chemistry of the Silicones, 2nd Edition, John Wiley & Sons (1151). Some of these organohalosilanes are, for example, methyltrichlorosilane, dimethyldichlorosilane, methylphenyldichlorosilane, trimethylchlorosilane, etc.

The silylorganometallocenes of the present invention are very effective antioxidants at high temperatures for polysiloxane fluids, such as dimethylpolysiloxane fluids. Other silylorganometallocenes, such as those disclosed in Wilkus et al. U.S. Pat. 3,326,952, Wilkus et al., U.S. Pat. 3,321,501 and Wilkus et al. U.S. Pat 3,324,157 are also antioxidants for polysiloxane fluids However, they are not effective high temperature antioxidants and were not able to pass the standard fluid clutch test as set forth in the examples below. Only the silylcarbamylorganometallocenes passed the fluid clutch test while the silylcarbonylorganometallocenes did not prevent the polysiloxane fluid from disintegrating and gelling prior to the termination of the test period.

The silylcarbamylorganometallocenes of the present invention are simply mixed with the polysiloxane fluid it is desired to stabilize against oxidation. Generally, 0.05–1.0 percent by weight of the silylcarbamylorganometallocene is used in the polysiloxane fluid and preferably 0.1 to 0.8 percent by weight. If less than 0.05 percent by weight is used, then the polysiloxane fluid is not protected from oxidation. If more than 1.00 percent by weight is used, then there is an unnecessary usage of silylorganometallocene materials.

In order that those skilled in the art will be better able to practice the invention, the following examples are given by way of illustration and not by way of limitation. All parts are by weight unless specified otherwise.

EXAMPLE 1

Into a 3-necked flask equipped with a magnetic agitator, thermometer, condenser and maintained under a nitrogen atmosphere there was added 9.4 parts (0.05 mole) of ferrocene and 100 ml. of dry ethylene chloride, After agitation had begun, there was added immediately 8.8 parts (0.05 mole) of chlorodimethylsilylpropylisocyanate. The reaction mixture was then heated at a temperature in the range of 15° to 90° C. and there was added over a two hour period 6.7 parts (0.05 mole) of anhydrous aluminum chloride. A blood red complex was formed. The reaction was kept at reflux for 48 hours.

At the end of that period the flask was cooled and the contents poured over ice. The deep blue aqueous phase was separated from the red organic phase, then the aqueous phase was washed with methylene chloride and the washings combined with the organic phase. The organic phase was dried, stripped of solvent and then chromatographed. The resulting product was eluted with ethanol and purified by crystallization from ether-benzene. The product was obtained in 82% yield as yellow solid with M.P. of 156°–158° C. and having the structure:

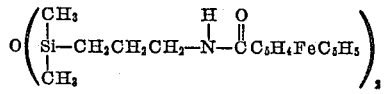

The elemental analysis of the product as found and as calculated theoretically is set forth below: Found (percent): Fe, 16.42; N, 4.18; Si, 8.52; C, 56.54; and H, 6.70. Theoretical (percent): Fe, 16.56; N, 4.15; Si, 8.33; C, 56.97; and H, 6.87.

EXAMPLE 2

Using the same equipment as the previous example, 3.2 parts (0.01 mole) of osmocene is added to 50 ml. of dry ethylene chloride. Agitation is begun and immediately there is added 1.8 parts (0.01 mole) of chlorodimethylsilylpropylisocyanate. The reaction mixture is then heated at a temperature in the range of 80° to 90° C. and there is added over a two hour period 1.3 parts (0.01 mole) of anhydrous aluminum chloride at which point a colored complex was formed. The reaction is kept at reflux for at least 48 hours. At the end of this period the flask is washed and the contents poured over ice. The aqueous phase was separated from the organic phase. Then the aqueous phase is washed with methylene chloride and the washings combined with the organic phase. The organic phase is dried, stripped of solvent and then chromatographed. The resulting product is eluted with ethanol and purified by crystallization from ether-benzene. The product is obtained in 78% yield as a solid having the structure:

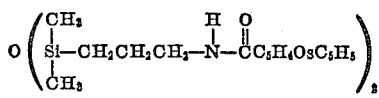

Infrared analysis and nuclear magnetic resonance spectra confirmed this structure.

EXAMPLE 3

Using the same equipment as in the previous example, 2.3 parts (0.01 mole) of ruthenocene is added to 100 ml. of dry ethylene chloride. Agitation is begun and immediately there was added 1.8 parts (0.01 mole) of chlorodimethylsilylpropylisocyanate. The reaction mixture is then heated at temperatures in the range of 75°–85° C. and there is added over a two hour period 1.3 parts (0.01 mole) of anhydrous aluminum chloride at which point a colored complex was formed. The reaction is kept at reflux for at least 50 hours. At the end of this period the flask was cooled and the contents poured over ice. The aqueous phase is separated from the organic phase. Then the aqueous phase was washed with methylene chloride and the washings combined with the organic phase. The organic phase was dried, stripped of solvent and then chromatographed. The resulting product is eluted with ethanol and purified by crystallization from ether-benzene. The product was obtained in 85% yield having the structure:

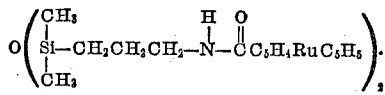

Infrared analysis and nuclear magnetic resonance spectra confirmed this structure.

EXAMPLE 4

Example 1 is repeated but before the hydrolysis stage is initiated, there was added 65 parts dimethyldichlorosilane. The hydrolysis of this mixture was then carried out with ice water. After separating the organic phase, it was dried, filtered and free of solvent. A red oil was left behind whose IR is consistent with the following formula:

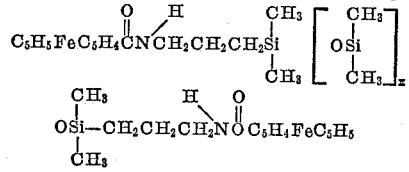

EXAMPLE 5

There was added to 9.4 parts ferrocene and 75 parts methylene chloride 19.8 parts methyldichlorosilylpropylisocyanate with agitation commenced, there was slowly added over a 1½ hour period 6.7 parts anhydrous aluminum chloride. A blood red complex developed. The reaction was allowed to stir at room temperature overnight. It was then decomposed with ice-$H_2O$. The organic phase separated, dried, stripped of solvent and purified by chromatography. A yellow solid was eluted with ethanol. It has a variable melting point. I.R. showed it to be a mixture of cyclics of the formula,

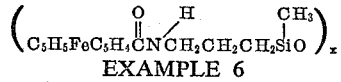

EXAMPLE 6

The silylorganoferrocene of Example 1, which is 1,3-bis(ferrocenoylaminopropyl)tetramethyldisiloxane, was dispersed at different concentrations in various samples of dimethylpolysiloxane fluids of 1,000 and 5,000 centistokes viscosity. The silylorganometallocene was insoluble and when heated to 140° C. a clear yellow solution was formed. On cooling the fluid became cloudy and microscopic examination showed it to be full of ribbon-like crystals. These crystals remained suspended in the fluid during freeze-thaw cycles and did not settle out. The samples of the mixtures were tested by placing 40 parts of the samples in a 150 ml. beaker and placing the beaker in an oven maintained at 290° C. The time for gelation as well as the iron concentration and the silylorganometallocene concentrations in the fluid is set forth in Table I below.

TABLE I

| Fluid viscosity of dimethylpolysilane, cs. | Concentration of— | | Time to gelation at 290° C., hours |
|---|---|---|---|
| | Iron, percent by weight | Silylorgano-metallocene, percent by weight | |
| 1,000 | 0.004 | | 168 |
| 1,000 | 0.0085 | | 692 |
| 1,000 | 0.017 | | >1,384 |
| 1,000 | 0 | 0 | >24 |
| 5,000 | 0.017 | | 296 |

All of the samples which exceeded a gelation time of 200 hours were placed in a puid clutch which was operated continuously for 200 hours. All these fluid materials passed the test satisfactorily.

EXAMPLE 7

A silylcarbonylorganometallocene having the formula:

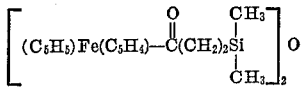

was mixed with samples of dimethylpolysiloxane fluid of different viscosities and at different concentrations. The mixtures were placed in an oven at 290° C. and the time to geletion recorded in Table II below.

TABLE II

| Fluid viscosity of dimethylpolysiloxane, cs. | Concentration of silylcarbonylorganometallocene, percent by weight | Time to gelation at 290° C. hours |
|---|---|---|
| 1,000 | 0.051 | >24 |
| 1,000 | 0.10 | >24 |
| 2,500 | 0.53 | >48 |
| 5,000 | 1.05 | 72 |
| 5,000 | 1.50 | 105 |

The 5,000 cs. viscosity fluid mixture with 1.50% by weight of the silylcarbonylorganometallocene was tested on a fluid clutch and failed after 100 hours and was thus found unsatisfactory.

What we claim is:

1. A process for protecting a polydiorganosiloxane fluid wherein all of the organo radicals are selected from the group consisting of monovalent hydrocarbon radicals and halogenated monovalent hydrocarbon radicals from oxidation at high temperatures comprising mixing in said polydiorganosiloxane fluid an effective amount of a siloxane organometallocene selected from the class consisting of (a) polymers having the structural units of the formula,

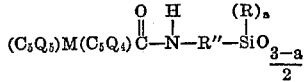

(b) copolymers composed of structural units of the formula,

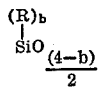

and at least one unit of (a), and (c) disiloxanes having the formula,

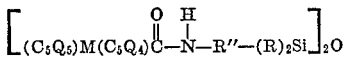

where R is a radical selected from the class consisting of monovalent hydrocarbon radicals, halogenated monovalent hydrocarbon radicals, cyanoalkyl radicals, and fluoroalkyl radicals, R″ is a radical selected from the class consisting of an arylene radical and an alkylene radical, $(C_5Q_5)M(C_5Q_4)$ is an organometallocene radical, Q is chemically bonded to a cyclopentadienyl radical and is a member selected from the class consisting of hydrogen, a monovalent electron donating organic radical selected from the class consisting of aryl radicals, hydroxyaryl radicals, aliphatic radicals, cycloaliphatic radicals, carboxy aliphatic radicals, triorganosilyl radicals, and nitroaliphatic radicals, and a monovalent electron withdrawing organic radical selected from the class consisting of aliphatic aryl radicals, arylaryl radicals, carboxyaryl radicals, nitroaryl radicals, haloaryl radicals, haloaliphatic radicals and mixtures thereof, M is a transition metal bonded to two cyclopentadienyl radicals and selected from the class consisting of titanium, vanadium, chromium, manganese, iron, cobalt, nickel, zirconium, columbium, molybdenum, technetium, ruthenium, rhodium, palladium, hafnium, tantalum, tungsten, rhenium, osmium, iridium, and platinum, $a$ is a whole number equal to from 1 to 2, and $b$ is a whole number equal to from 0 to 3.

2. The process of claim 1 wherein the amount of silylorganometallocene is 0.05–1.0% by weight of silicone fluid.

3. The process of claim 2 wherein the silicone fluid is dimethylpolysiloxane.

References Cited

UNITED STATES PATENTS

| 3,324,157 | 6/1967 | Wilkus et al. | 260—439 CY |
| 3,326,952 | 6/1967 | Wilkus et al. | 260—439 CY |
| 3,306,851 | 2/1967 | McCarthy et al. | 252—49.7 X |
| 3,321,501 | 5/1967 | Wilkus et al. | 252—49.7 X |

DANIEL E. WYMAN, Primary Examiner

W. H. CANNON, Assistant Examiner

U.S. Cl. X.R.

252—400

UNITED STATES PATENT OFFICE
CERTIFICATE OF CORRECTION

Patent No. 3,745,129      Dated July 10, 1973

Inventor(s) BROWN, EDGAR D., JR., ET. AL.

It is certified that error appears in the above-identified patent and that said Letters Patent are hereby corrected as shown below:

Column 1 in the heading, line 6, after "N.Y. 12309", insert -- assignors to General Electric Company, Waterford, N.Y. -- .

Signed and sealed this 25th day of December 1973.

(SEAL)
Attest:

EDWARD M. FLETCHER, JR.
Attesting Officer

RENE D. TEGTMEYER
Acting Commissioner of Patents